United States Patent
Nanaumi

(10) Patent No.: US 11,501,515 B2
(45) Date of Patent: Nov. 15, 2022

(54) APPARATUS, STORAGE MEDIUM, AND CONTROL METHOD FOR REMOVING A NOISE FROM A DIVIDED LINE IMAGE OBTAINED BY A CHARACTER IMAGE

(71) Applicant: CANON KABUSHIKI KAISHA, Tokyo (JP)

(72) Inventor: Yoshihito Nanaumi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 16/907,000

(22) Filed: Jun. 19, 2020

(65) Prior Publication Data
US 2020/0410276 A1    Dec. 31, 2020

(30) Foreign Application Priority Data
Jun. 27, 2019  (JP) .............................. JP2019-120036

(51) Int. Cl.
G06V 10/75    (2022.01)
G06V 10/30    (2022.01)
G06V 30/10    (2022.01)

(52) U.S. Cl.
CPC ............ *G06V 10/30* (2022.01); *G06V 10/751* (2022.01); *G06V 30/10* (2022.01)

(58) Field of Classification Search
CPC .... G06K 9/40; G06K 9/6202; G06K 2209/01; G06K 9/00469; G06K 9/00449
See application file for complete search history.

(56) References Cited

U.S. PATENT DOCUMENTS

| | | | | |
|---|---|---|---|---|
| 4,156,880 A | * | 5/1979 | Yamada | G06T 9/005 358/3.29 |
| 5,588,072 A | * | 12/1996 | Wang | G06K 9/00442 382/176 |
| 5,680,479 A | * | 10/1997 | Wang | G06K 9/00456 382/171 |
| 5,809,166 A | * | 9/1998 | Huang | G06K 9/342 382/174 |
| 6,081,616 A | * | 6/2000 | Vaezi | G06K 9/00456 382/171 |
| 6,332,046 B1 | * | 12/2001 | Fujimoto | G06K 9/00463 382/174 |
| 6,721,451 B1 | * | 4/2004 | Ishitani | G06K 9/00469 382/175 |
| 7,136,082 B2 | * | 11/2006 | Saund | G06K 9/00409 345/619 |

(Continued)

FOREIGN PATENT DOCUMENTS

JP          63-136181 A     6/1988

*Primary Examiner* — Aaron W Carter
(74) *Attorney, Agent, or Firm* — Canon U.S.A., Inc. IP Division

(57) ABSTRACT

High-accuracy character recognition has not been realized for a document having a space between lines is narrow, a document in which line contact occurs at a plurality of positions, and a document in which a ratio of lines with line contact is high. Noises are removed from divided line images that are obtained by dividing a text image into line units, and the removed noises are added to a neighboring divided text line image, thus restoring the character image which has been divided into the plurality of lines. This realizes the high-accuracy character recognition.

19 Claims, 11 Drawing Sheets

(56) References Cited

U.S. PATENT DOCUMENTS

| | | | | |
|---|---|---|---|---|
| 2003/0026482 A1* | 2/2003 | Dance | .................. | G06K 9/3283 |
| | | | | 382/199 |
| 2004/0146216 A1* | 7/2004 | Andel | .................... | G06K 9/342 |
| | | | | 382/277 |
| 2006/0067759 A1* | 3/2006 | Osaka | .................. | G03G 21/046 |
| | | | | 399/366 |
| 2008/0069447 A1* | 3/2008 | Hotta | ..................... | G06K 9/346 |
| | | | | 382/182 |
| 2009/0055159 A1* | 2/2009 | Kato | ...................... | G06F 40/40 |
| | | | | 704/3 |
| 2012/0045129 A1* | 2/2012 | Sun | ...................... | G06K 9/3283 |
| | | | | 382/176 |
| 2013/0195315 A1* | 8/2013 | Baheti | ............. | G06V 30/18095 |
| | | | | 382/176 |
| 2017/0351913 A1* | 12/2017 | Chen | .................. | G06K 9/00442 |
| 2018/0053048 A1* | 2/2018 | Zhou | ...................... | G06K 9/344 |
| 2019/0266397 A1* | 8/2019 | Arakawa | ............ | H04N 1/00413 |
| 2020/0250841 A1* | 8/2020 | Itonori | ............... | G06K 9/00463 |
| 2020/0410276 A1* | 12/2020 | Nanaumi | ................. | G06K 9/40 |

* cited by examiner

FIG.3

```
              Foods Market
                   Seattle
              (205) 443-07890
   DATE        03/08/2018  CHK 0003

Item                      Price
    ---------------------------------
     GINGER BEER              $3.50
     BATTERED CHIPS M         $4.90
     MIEL ORIGINAL            $13.50
    ---------------------------------
   SUBTOTAL                   $21.90
   ( SALES TAX 4.712          $1.00 )
   TOTAL                      $22.90
   Cash                       $23.00
   CHANGE                     $0.10
```

~301

SUBTOTAL                $21.90 ~507
510
   (SALES TAX 4.712      ($1.00) ~508
511
   TOTAL                 $22.90 ~509

(SALES TAX 4.712         $1.00) ~512

TOTAL                    $22.90 ~513

SUBTOTAL                 $21.90 ~514

(SALES TAX 4.712         . $1.00) ~515

FIG.7A

700
DATE  03/08/2018 CHK 0003  702 703 704
Item                       Price       705
                            701

FIG.7B

DATE    03/08/2018  CHK 0003 ~706
709      708          709
Item                   Price  ~707

FIG.7C

DATE    03/08/2018  CHK 0003 ~710

Item                   Price ~711

FIG.7D

713
DATE    03/08/2018  CHK 0003
          716   715
714~ Item              Price
              717

FIG.7E

718
 HK  716      HK ~719
    rice       rice ~720
717

FIG.9A

SUBTOTAL .... $21.90 ~901
905 ⇢ 904
(SALES TAX 4.712    ($1.00) ~902
⇢ 906
907⇢
TOTAL    $22.90 ~903

FIG.9B

SUBTOTAL    $21.90 ~908

(SALES TAX 4.712    ($1.00) ~909

TOTAL    $22.90 ~910

FIG.9C

SUBTOTAL    $21.90 ~911

(SALES TAX 4.712    ($1.00) ~912

TOTAL    $22.90 ~913

FIG.11A
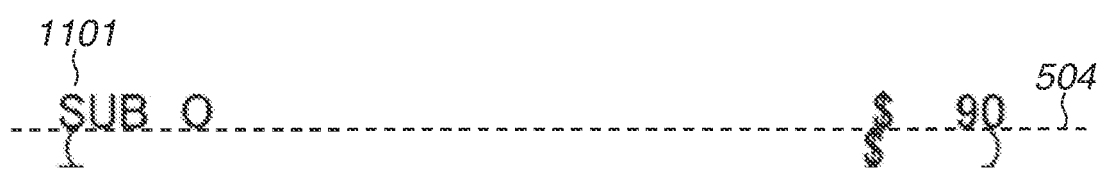
FIG.11B
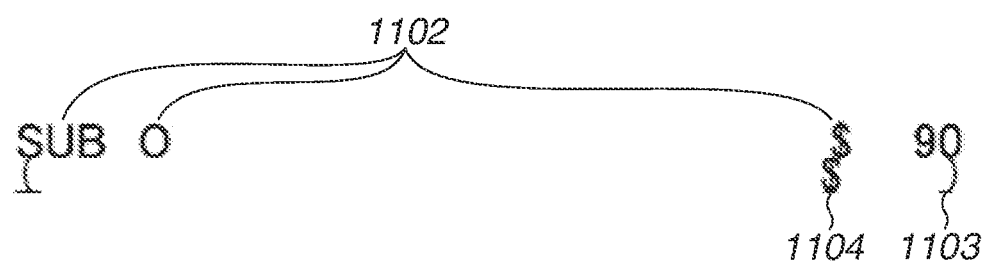
FIG.11C
SUBTOTAL $21.90 ~1105
( SALES TAX 4.712 . $1.00 ) ~1106

APPARATUS, STORAGE MEDIUM, AND CONTROL METHOD FOR REMOVING A NOISE FROM A DIVIDED LINE IMAGE OBTAINED BY A CHARACTER IMAGE

BACKGROUND OF THE INVENTION

Field of the Invention

The aspect of the embodiments relates to an information processing apparatus capable of removing a noise from a divided line image obtained by a character image being divided in line units and performing noise combination, an information processing method, and a storage medium.

Description of the Related Art

Optical character recognition (OCR) is a technology for recognizing characters in an image that is read by a camera or a scanner. To recognize the characters in the image, positions and sizes of character regions are grasped by dividing a document in line units and character units (hereinafter, line dividing and character dividing), and character recognition processing is performed on each of the character regions to specify the characters.

However, in extracting a text line by line dividing processing, in a case where the sizes and arrangement of the characters vary or in a case where dust is present in reading of the document, a part of pixels of other characters near the text line is extracted together, and pixels of characters in a line different from a target text line may be included in the target text line. In a case where a text line image as a result of the line dividing processing is divided in character units and the character recognition processing is performed, each character is recognized as a character rectangle that includes noise pixels, such as a part of the pixels of another character, which deteriorates the OCR accuracy.

As an existing solving means to such an issues, Japanese Patent Application Laid-Open No. 63-136181 discusses a method for detecting a noise in an extracted character region, and performing character recognition on a noise-removed region, thus enhancing the OCR accuracy.

In an image printed by a printer the function of intentionally narrowing a space between lines to save roll paper, represented by, for example, a receipt printer, pixels forming characters deeply get in upper or lower line of the line including the pixel in some cases. As a result, contact of characters (line contact) occurs at a plurality of positions in the space between the lines. When such a noise occurs at the plurality of positions, the OCR accuracy may not be enhanced only by removing the noise in the character region as discussed in Japanese Patent Application Laid-Open No. 63-136181.

SUMMARY OF THE INVENTION

According to an aspect of the embodiments, an apparatus that reads image data includes a memory and a processor in communication with the memory. The processor performs first dividing to determine dividing positions for text line regions based on the image data and to divide the image data into the text line regions at the determined dividing positions, first detection to detect a pixel block forming a character contacting any of the dividing positions for the text line regions, first determination to determine whether the pixel block detected in the first detection satisfies a first predetermined condition, and first combination to combine the pixel block that is determined to satisfy the first predetermined condition in the first determination, with a text line region adjacent to the pixel block across a dividing position that the pixel block contacts.

Further features of the disclosure will become apparent from the following description of exemplary embodiments with reference to the attached drawings.

BRIEF DESCRIPTION OF THE DRAWINGS

FIG. 3 is a diagram illustrating an example of a scanned image.

FIGS. 7A, 7B, 7C, 7D, and 7E are diagrams illustrating the processing according to the second exemplary embodiment.

FIGS. 9A, 9B, and 9C are diagrams illustrating processing according to the third exemplary embodiment.

FIGS. 11A, 11B, and 11C are diagrams illustrating processing according to the fourth exemplary embodiment.

DESCRIPTION OF THE EMBODIMENTS

Exemplary embodiments of the disclosure are described below with reference to accompanying drawings. The following exemplary embodiments do not limit the disclosure according to the appended claims, and not all combinations of features described in the exemplary embodiments are necessarily essential for solving means of the disclosure.

First Exemplary Embodiment

Figure 1:
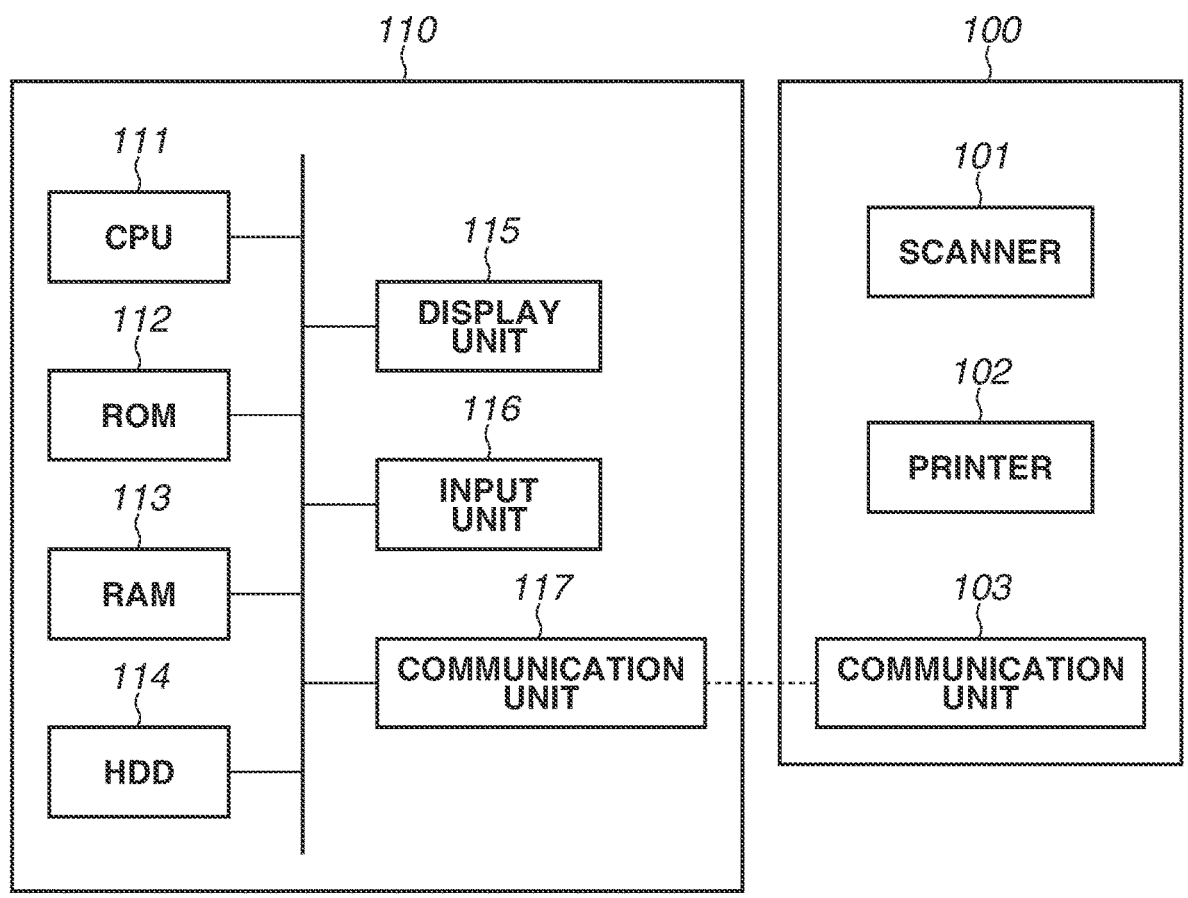
FIG. 1 is a diagram illustrating an information processing system according to a first exemplary embodiment.

FIG. 1 is a diagram illustrating an information processing system according to the present exemplary embodiment. The information processing system includes a copying apparatus 100 and an information processing apparatus 110. The copying apparatus 100 and the information processing apparatus each are not necessarily an individual apparatus. The copying apparatus 100 may include the entire configuration of the information processing apparatus 110, and the following processing may be performed only by the copying apparatus 100. The copying apparatus 100 includes a scanner 101, a printer 102, and a copying apparatus-side communication unit 103. The scanner 101 scans a document to generate a scanned image. The printer 102 performs printing. The copying apparatus-side communication unit 103 communicates with an external apparatus through a network.

The information processing apparatus 110 includes a central processing unit (CPU) 111, a read-only memory (ROM) 112, a random access memory (RAM) 113, a hard disk drive (HDD) 114, a display unit 115, an input unit 116, and an information processing apparatus-side communication unit 117. The CPU 111 reads out control programs stored in the ROM 112, and performs various types of processing. The RAM 113 is used as a temporarily storage area, such as a main memory and a work area of the CPU 111. The HDD 114 stores, for example, various types of data, various programs. The functions and processing of the information processing apparatus 110 described below are realized by the CPU 111 reading out programs stored in the ROM 112 or the HDD 114 and executing the programs.

The information processing apparatus-side communication unit 117 performs communication processing with an external apparatus through a network. The display unit 115 displays various types of information. The input unit 116 includes a keyboard and a mouse, and receives various types of operation by a user. The display unit 115 and the input unit 116 may be integrally provided like a touch panel. The display unit 115 may perform projection by a projector, and the input unit 116 may receive user operation by a camera recognizing a position of a fingertip with respect to a projected image.

In the present exemplary embodiment, the scanner 101 of the copying apparatus 100 scans a document, such as a receipt, to generate image data (scanned image 301). The scanned image 301 is transmitted to the information processing apparatus 110 by the copying apparatus-side communication unit 103. In the information processing apparatus 110, the information processing apparatus-side communication unit 117 receives an input image, and stores the input image in a storage unit, such as the HDD 114.

Figure 2:
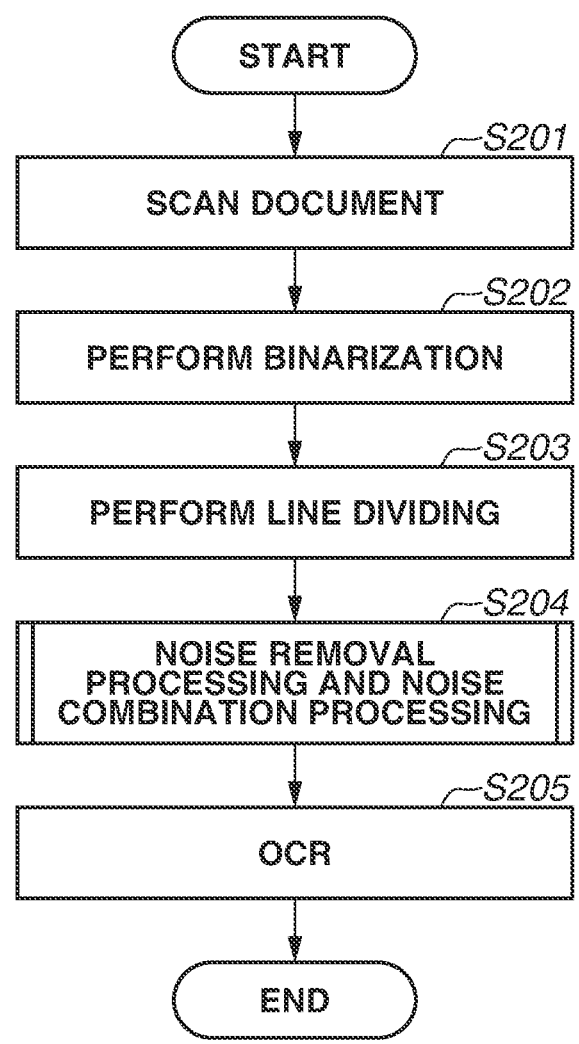
FIG. 2 is a flowchart illustrating an entire flow according to the first exemplary embodiment of the disclosure.

FIG. 2 is a flowchart of noise removal processing and noise combination processing which are performed on a divided line image (image obtained by dividing character image in line units) by the information processing apparatus 110 according to the present exemplary embodiment. This flowchart is started when the user performs operation to start scanning on the copying apparatus 100. In step S201, when the scanner 101 of the copying apparatus 100 scans a document, the CPU 111 stores a scanned image in the HDD 114. FIG. 3 illustrates an example of the scanned image of the document. The scanned image 301 is a scanned image of a receipt. In the present exemplary embodiment, the scanned image of the receipt is used as an example in which line contact (contact (overlap) of characters across a space between neighboring lines) occurs at a plurality of positions in the image. Alternatively, the scanned image may be a document in which a space between lines is narrow and the line contact occurs at a plurality of positions, or a document in which the line contact occurs due to the presence of dust in scanning.

Next, in step S202, the CPU 111 performs binarization processing on the scanned image 301, and the CPU 111 stores a binary image in the RAM 113. The binarization processing is processing of converting an image into a two-tone image of black and white. A pixel of a color deeper than a threshold becomes a black pixel, and a pixel of a color lighter than the threshold becomes a white pixel. In the present exemplary embodiment, the binary image is generated through a method in which the threshold is determined from an entire histogram of the scanned image 301; however, the method may be any method through which the image is converted into a binary image of black and white with an accuracy enabling subsequent character recognition.

Figures 5A, 5B, 5C, 5D:
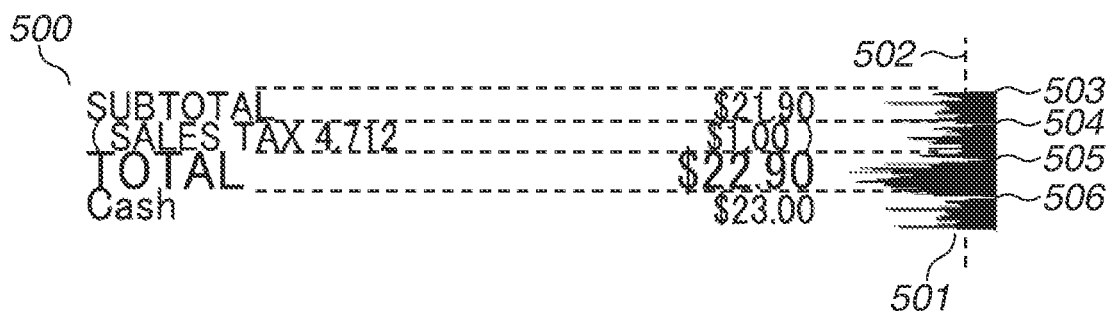
FIGS. 5A, 5B, 5C, and 5D are diagrams illustrating the processing according to the first exemplary embodiment.

Next, in step S203, the CPU 111 performs line dividing on the binary image obtained through the process in step S202, and the CPU 111 stores information on divided lines in the RAM 113. In the present exemplary embodiment, determination of the line dividing is made through a method in which the number of black pixels that appear in each pixel line through projection of the entire document in a lateral direction, is counted to create a frequency distribution, and a region of a pixel line having the number of black pixels larger than or equal to a threshold is determined to be a position of the text line. The CPU 111 stores information about a position of the region determined to be the text line as line information in the RAM 113. The detail of the line dividing is described with reference to FIGS. 5A to 5D. FIG. 5A illustrates a binary image 500 that is a part of the scanned image 301 according to the present exemplary embodiment and a frequency distribution (histogram) 501 thereof. In the frequency distribution 501, a pixel line having the number of black pixels larger than a predetermined threshold 502 is a pixel line having a large number of black pixels of characters, and represents a position of the text line region. In contrast, near upper and lower boundaries of the text line region, the number of black pixels of characters is smaller than a center part. Thus, a position of the pixel line having the number of black pixels lower than or equal to the predetermined threshold 502 in the frequency distribution 501 is determined to be a line dividing position used for dividing the image into each text line region. Each of a position 503, a position 504, a position 505, and a position 506 is a position at which the number of block pixels is lower than the threshold 502, and is the line dividing position.

Next, in step S204, the CPU 111 performs noise removal processing and noise combination processing. The detail of the processing will be described below.

Next, in step S205, the CPU 111 performs optical character recognition (OCR) processing on the binary image having been subjected to the noise removal processing and the noise combination processing, and the CPU 111 stores a result of the OCR processing in the RAM 113.

Figure 4:
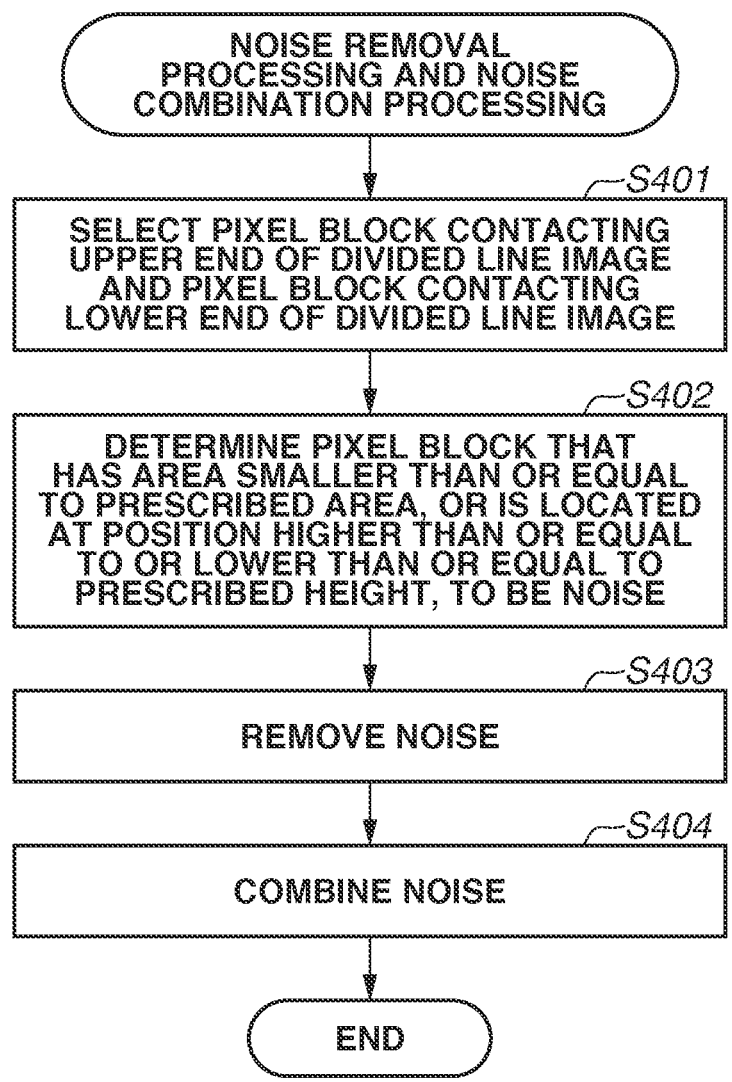
FIG. 4 is a flowchart illustrating noise removal processing and noise combination processing according to the first exemplary embodiment.

FIG. 4 is a flowchart illustrating the noise removal processing and the noise combination processing in step S204 according to the present exemplary embodiment. In step S401, the CPU 111 acquires the line information obtained in step S203 from the RAM 113, and generates a divided line image based from the line information. FIG. 5B illustrates the divided line images according to the present exemplary embodiment. A divided line image 507 is an image of a line region sandwiched between the line dividing positions 503 and 504. A divided line image 508 is an image of a line region sandwiched between the line dividing positions 504 and 505. A divided line image 509 is an image of a line region sandwiched between the line dividing positions 505 and 506. The CPU 111 performs, on the divided line image, processing of assigning the same number to consecutive white pixels or consecutive black pixels (labeling processing). The consecutive pixels assigned with the same number by the labeling processing are regarded as a pixel block (one block of pixels). The CPU 111 selects a pixel block contacting the line dividing position at an upper end of the divided line image and a pixel block contacting the line dividing position at a lower end of the divided line image, from among the pixel blocks extracted as a result of the labeling processing.

Next, in step S402, the CPU 111 selects a pixel block that has an area smaller than or equal to a prescribed area, or a pixel block that is located at a position higher than or equal to or lower than or equal to a prescribed height, from the pixel blocks selected in step S401, and determines the selected pixel blocks to be a noise. To detect a text pixel of other lines, due to the line contact, as a noise, the pixel block that contacts with the line dividing position and has an area smaller than or equal to a prescribed area, or a pixel block that contacts with the line dividing position and is located at a position higher than or equal to or lower than or equal to a prescribed height are determined to be a noise. An example of the noise is illustrated in FIG. 5B. Pixel blocks 510 are noise pixel blocks determined to be a noise in the divided line image 508. Pixel blocks 511 are noise pixel blocks determined to be a noise in the divided line image 509.

Next, in step S403, the CPU 111 removes the pixel blocks determined to be a noise from the divided line image. FIG. 5C illustrates noise-removed images according to the present exemplary embodiment. A noise-removed image 512 is an image obtained by removing the noise pixel blocks 510 from the divided line image 508. A noise-removed image 513 is an image obtained by removing the noise pixel blocks 511 from the divided line image 509.

Next, in step S404, the CPU 111 determines whether each of the noise pixel blocks removed in step S403 is combinable with a divided line image adjacent to the noise pixel block across the line dividing position. In a case where the noise pixel block is combinable, the CPU 111 performs restoration processing of combining the pixel blocks. Here, if the pixel block obtained by the combining of the noise pixel block with the divided line image adjacent thereto across the line dividing position is isolated, the noise pixel block is determined to not be combinable. If the noise pixel block becomes a part of an original pixel block in the neighboring divided line image, the noise pixel block is determined to be combinable. FIG. 5D illustrates restored images according to the present exemplary embodiment. A restored image 514 is an image obtained by combining the noise pixel blocks 510 with the divided line image 507. A restored image 515 is an image obtained by combining the noise pixel blocks 511 with the noise-removed image 512. In this way, in a case where the line contact (contact of characters across line dividing position) occurs at a plurality of positions and pixels forming the characters deeply get in the upper line or the lower line, the characters can be restored into respective correct shapes by removing and combining the noise in the image near the line dividing positions, thus improving the OCR accuracy.

Second Exemplary Embodiment

A second exemplary embodiment of the disclosure will be described below. In the present exemplary embodiment, only differences from the first exemplary embodiment will be described, and configurations and procedures not particularly described are similar to those according to the first exemplary embodiment.

In the first exemplary embodiment, if the pixel block obtained by combining the removed noise with the divided line image adjacent thereto across the line dividing position is isolated, the noise pixel block is determined to be not combinable. Thus, an originally isolated pixel block (e.g., punctuation marks) cannot be appropriately restored. When the line dividing is performed in a case where an isolated pixel block is in contact with an upper or lower character as described above, the line dividing may not be correctly performed. In the second exemplary embodiment, however, even in a case where the isolated pixel block is included in an incorrect line as a result of the line dividing, it is possible to restore the isolated pixel block at the correct position.

Figure 6:
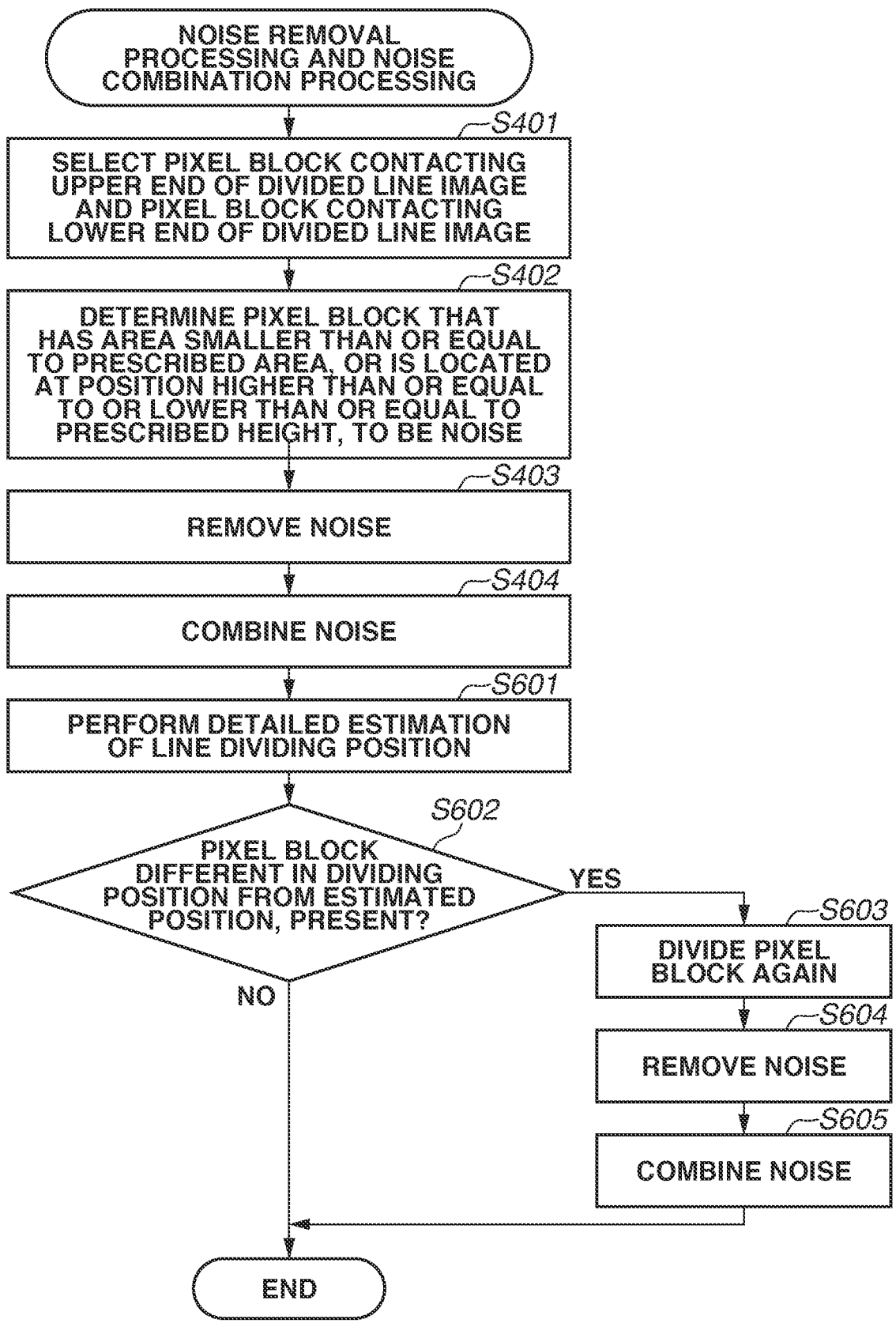
FIG. 6 is a flowchart illustrating noise removal processing and noise combination processing according to a second exemplary embodiment.

FIG. 6 is a flowchart illustrating the noise removal processing and the noise combination processing in step S204 according to the present exemplary embodiment. The flowchart will be described with reference to FIGS. 7A, 7B, and 7C.

FIG. 7A illustrates a binary image 700 that is a part of the scanned image according to the present exemplary embodiment and a projection image 701 thereof. A threshold 702 702 represents a threshold to the projection image, and a pixel line that has the number of black pixels lower than or equal to the threshold 702 is determined to be the line dividing position. Each of a position 703, a position 704, and a position 705 is a position at which the number of black pixels is lower than the threshold 702, and is the line dividing position. FIG. 7B illustrates divided line images according to the present exemplary embodiment. A divided line image 706 is an image of a line region sandwiched between the line dividing positions 703 and 704. A divided line image 707 is an image of a line region sandwiched between the line dividing positions 704 and 705.

In step S401, the CPU 111 performs the labeling processing on the divided line image. The CPU 111 acquires a pixel block contacting the line dividing position at an upper end of the divided line image and a pixel block contacting the line dividing position at a lower end of the divided line image, from the pixel blocks (connected components) extracted as a result of the labeling processing.

Next, in step S402, the CPU 111 selects a pixel block that has an area smaller than or equal to a prescribed area, or a pixel block that is located at a position higher than or equal to or lower than or equal to a prescribed height, from the pixel blocks acquired in step S401, and determines the selected pixel blocks to be a noise. In FIG. 7B, noise pixel blocks 708 are pixel blocks determined to be a noise in the divided line image 706. Noise pixel blocks 709 are pixel blocks determined to be a noise in the divided line image 707.

Next, in step S403, the CPU 111 removes the pixel blocks determined to be a noise from the divided line image. In step S404, the CPU 111 combines the noise. FIG. 7C illustrates restored images obtained through noise combination according to the present exemplary embodiment. A restored image 710 after the noise combination is an image obtained by removing the noise pixel blocks 708 from the divided line image 706 and combining the noise pixel blocks 709 with the divided line image 706. A restored image 711 is an image obtained by removing the noise pixel blocks 709 from the divided line image 707 and combining the noise pixel blocks 708 with the divided line image 707. As understood from the restored image 710 and the restored image 711, a tittle of a character "i" of "Price" is combined with a lower end of a character "K" of "CHK". In a case where an isolated pixel block, such as punctuation marks and a tittle which is isolated from other blocks forming a character, near the line dividing position contacts the character of the other line, erroneous determination may occur in the OCR processing even if the noise removal processing and the noise combination processing are performed.

To enhance the OCR accuracy for such a case, in processing from steps S601 to S605, detailed estimation of the line dividing positions in the entire image data is performed on the restored image after step S404, and the line dividing, the noise removal processing, and the noise combination processing are performed again based on the estimation.

In step S601, the CPU 111 performs the labeling processing again on the restored image, and acquires positional information on an upper end and a lower end of each of the labeled pixel blocks. Reliability representing whether the upper end position and the lower end position of each of the pixel blocks are usable as an upper end and a lower end of the corresponding line is set, and line estimation is performed based on the reliability of each of the pixel blocks. More specifically, the reliability of the upper end position and the lower end position of each of the pixel blocks are set based on the following three classifications.

(1) In a case where a pixel block has been subjected to the restoration processing in step S404 at the upper end and the lower end of the pixel block, and an upper end position or a lower end position of the restored pixel block is coincident with an upper end position or a lower end position of the other plurality of pixel blocks, the reliability for the position is set to high.

(2) In a case where a pixel block has not been subjected to the restoration processing in step S404 at the upper end and the lower end of the pixel block, and an upper end position or a lower end position of the pixel block is coincident with an upper end position or a lower end position of the other plurality of pixel blocks, the reliability for the position is set to middle.

(3) In a case where a pixel block has been subjected to the restoration processing in step S404 at the upper end and the lower end of the pixel block, and an upper end position or a lower end position of the restored pixel block is not coincident with an upper end position or a lower end position of the other plurality of pixel blocks, the reliability for the position is set to low.

The reliability of the classification (1) is set to high is because, when the upper end position or the lower end position of the pixel block subjected to the restoration processing is located at the position same as the other pixel blocks, it is highly likely that the restoration has been correctly performed and that, since the pixel block near the line dividing position is restored, the pixel block becomes the upper end or the lower end of the line. In contrast, in a case where the upper end or the lower end of the pixel block subjected to the restoration block is not located at the position same as the other pixel blocks, it is presumed that a possibility that the restoration processing has correctly performed is low. Accordingly, the reliability of the classification (3) is set to low.

Next, the line dividing position is estimated from information on the upper end positions and the lower end positions of all of the pixel blocks and the classification information of the above-described three classification. First, in a case where no position having reliability set to high is present, a position having middle reliability is set as a detailed estimated line dividing position (position estimated as line dividing position). In a case where there is one position having reliability set to high, the position is set as the detailed estimated line dividing position. In a case where there is a plurality of positions each having reliability set to high, a position having the highest frequency of being set to high reliability is set as the detailed estimated line dividing position. FIG. 7D is a diagram illustrating the detailed estimation of the line dividing position. The reliability for a detailed estimated line dividing position 716 is determined to be high because lower end positions of pixels of "C" and "H" subjected to the restoration processing at the lower end of the restored image 710 are coincident with a lower end position of the other pixel blocks. A pixel block 713 of "K" is a pixel block subjected to the restoration processing at the lower end; however, the lower end position of the pixel block 713 is not coincident with the lower end position of the other pixel blocks. Thus, the reliability is set to low. In such a case, the detailed estimated line dividing position 716 having high reliability is determined to be the line dividing position.

Reliability of a detailed estimated line dividing position 717 is determined to be high because upper end positions of pixels of "I" and pixels of "P" subjected to the restoration processing at the upper end of the restored image 711 are coincident with an upper end position of the other pixel blocks. In step S601, the detailed estimated line dividing position having the highest reliability is set as the detailed estimated line dividing position. The processing then proceeds to step S602.

Next, in step S602, the CPU 111 determines whether there is a difference between the detailed estimated line dividing position set in step S601 and the line dividing position obtained in step S203. If a difference is present (YES in step S602), the processing proceeds to step S603. If no difference is present (NO in step S602), the processing ends.

Next, in step S603, the CPU 111 re-divides the pixel block having the line dividing position different from the detailed estimated line dividing position, at the detailed estimated line dividing position.

Next, in step S604, the CPU 111 performs processing of removing a noise which generates as a result of the re-dividing.

Next, in step S605, the CPU 111 performs processing of combining the noise which generates as a result of the re-dividing.

FIG. 7E illustrates an image obtained through the re-dividing at the detailed estimated line dividing position, the noise removal processing, and the noise combination processing according to the present exemplary embodiment. Re-divided images 719 and 720 are images obtained by performing, on the pixel block "K" 718 in a character string "CHK" that has been divided at the line dividing position 715 in FIG. 7D, the re-dividing at the detailed estimated line dividing position 717, and performing the noise removal processing and the noise combination processing. At the time when the line dividing is performed at the line dividing position 715, a pixel block of a part of a tittle of a character "i" in a lower line is combined with the pixel block of the pixel block "K" 718. Performing the re-dividing at the detailed estimated line dividing position enables the pixel block of the tittle combined with the character "K" to be set to a correct position.

In this way, in a case where the isolated pixel block which is a part of a character and isolated from the other part of the character, such as a tittle of "i", or an isolated pixel block near the line dividing position such as a punctuation mark contacts the upper or lower character, it is possible to more accurately restore the character rectangle by performing the detailed estimation of the line dividing position and the re-dividing of the pixel block. This makes it possible to improve the OCR accuracy.

Third Exemplary Embodiment

A third exemplary embodiment of the disclosure will be described below. In the present exemplary embodiment, only differences between the present exemplary embodiment and the first and second exemplary embodiments will be described below, and configurations and procedures not particularly described are similar to the configurations and the procedures according to the first and second exemplary embodiments. When the line contact occurs, a part of the pixel block forming a character may be included in a different line by the line dividing, and the character may be deficient. Thus, the line dividing is performed in such a manner that the line region is largely set, to prevent such a deficiency.

Figure 8A:
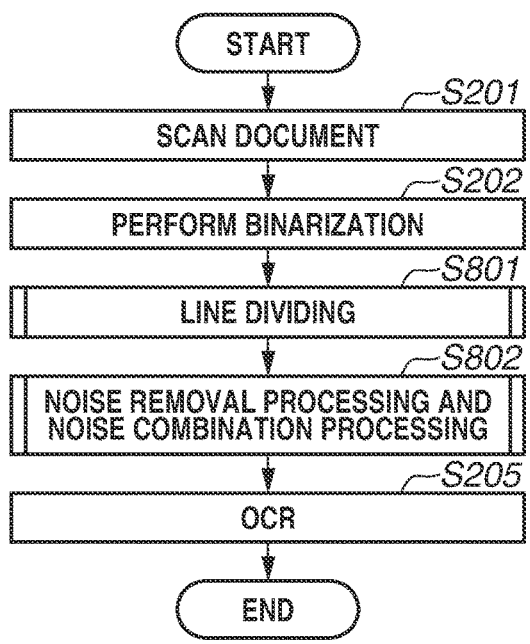
FIGS. 8A, 8B, and 8C are flowcharts according to a third exemplary embodiment of the disclosure.
Figure 8B:
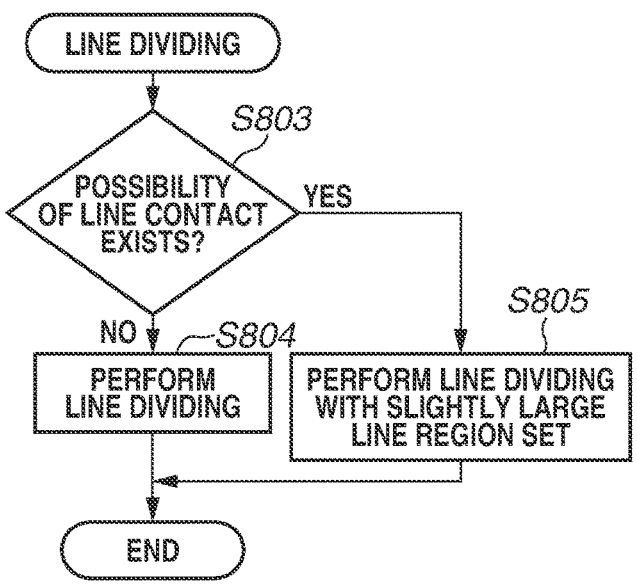
Figure 8C:
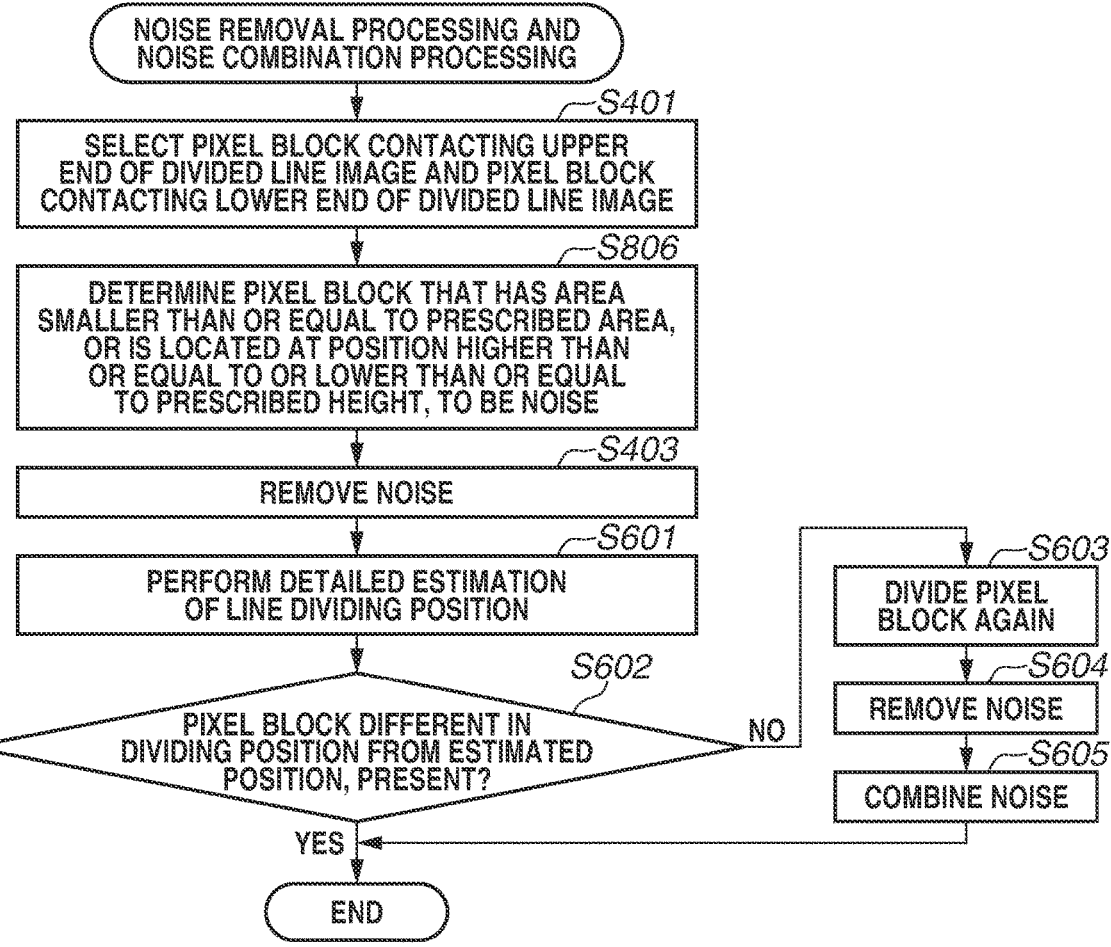

FIGS. 8A to 8C are flowcharts illustrating the noise removal processing according to the present exemplary embodiment. These flowcharts are described with reference to FIGS. 9A, 9B, and 9C. In step S801 of FIG. 8A, the CPU 111 performs the line dividing processing on the binary image. The line dividing processing is different from the processing in step S203. The detail of the processing will be described below. Next, in step S802, the CPU 111 performs the noise removal processing and the noise combination processing. The detail of the processing will be described below.

The line dividing in step S801 will be described with reference to FIG. 8B. In step S803, the CPU 111 projects the entire document in a line direction, and a region of pixel lines each having the number of black pixels larger than or equal to a threshold is determined to be a line. Further, a possibility of line contact is determined for a part having the number of black pixels lower than or equal to a threshold. More specifically, if the number of black pixels is zero, it is determined that the upper and lower lines do not contact at all (NO in step S803). The processing proceeds to step S804. If the number of black pixels is lower than or equal to the threshold but is larger than or equal to a predetermined value that is not zero, it is determined that the upper and lower lines have a contact part (YES in step S803), and the processing proceeds to step S805.

In step S804, the CPU 111 stores, as line information, a position of the region determined to be a line in the RAM 113.

Next, in step S805, in consideration of the possibility of row contact, the CPU 111 stores an area having a value slightly larger than the area determined as a row in the RAM 113 as row information.

FIG. 9A illustrates divided line images according to the present exemplary embodiment. A divided line image 901 is a divided line image obtained by performing the line dividing after the possibility of the line contact for the position 503 and the position 504 in FIG. 5A is determined in step S803. The position 503 is determined to have no possibility of line contact in step S803 (NO in step S803), the processing proceeds to step S804. In step S804, the line dividing is performed. The position 504 is determined to have the possibility of line contact in step S803 (YES in step S804), the processing proceeds to step S805. In step S805, the line dividing is performed at a region slightly larger than the position 504. Similarly, a divided line image 902 is a divided line image obtained by performing the line dividing after the possibility of line contact for the position 504 and the position 505 is determined. The position 504 is determined to have the line contact possibility in step S803 (YES in step S803), the processing proceeds to step S805. In step S805, the line dividing is performed at a region slightly larger than the position 504. The position 505 is determined to have the line contact possibility in step S803, and the line dividing is performed at a region slightly larger than the position 505 in step S805. Similarly, a divided line image 903 is a divided line image obtained by performing the line dividing after the possibility of the line contact for the position 505 and the position 506 is determined. The position 505 is determined to have no possibility of the line contact in step S803 (NO in step S803), the processing proceeds to step S804. In step S804, the line dividing is performed. The position 506 is determined to have the possibility of the line contact in step S803 (YES in step S803), the processing proceeds to step S805. In step S805, the line dividing is performed at a region slightly larger than the position 506.

The noise removal processing and the noise combination processing in step S802 will be described with reference to FIG. 8C. Only differences from the processing in FIG. 6 will be described. In step S806, the CPU 111 selects a pixel block that has an area smaller than or equal to a prescribed area, or a pixel block that is located at a position higher than or equal to or lower than or equal to a prescribed height, from the pixel blocks selected in step S401, and determines the selected pixel blocks as a noise. At this time, the threshold for the area of the pixel block and the threshold for the height of the pixel block are determined in consideration of the size of a margin of the line region from the line dividing position. Noise pixel blocks 904 are pixel blocks determined to be a noise in the divided line image 901. Noise pixel blocks 905 and 906 are pixel blocks determined to be a noise in the divided line image 902. Noise pixel blocks 907 are pixel blocks determined to be a noise in the divided line image 903. FIG. 9B illustrates noise-removed images according to the present exemplary embodiment. A noise-removed image 908 is an image obtained by removing the noise pixel blocks 904 from the divided line image 901. A noise-removed image 909 is an image obtained by removing the noise pixel blocks 905 and 906 from the divided line image 902. A noise-removed image 910 is an image obtained by removing the noise pixel blocks 907 from the divided line image 903. Since the line region is largely set in the line dividing, the subsequent noise combination processing is not performed.

FIG. 9C illustrates images obtained through the re-dividing at the detailed estimated line dividing position after the noise removal processing, the noise removal processing, and the noise combination processing according to the present exemplary embodiment. Re-divided images 911, 912, and 913 are images respectively obtained by performing the re-dividing processing on the noise-removed images 908, 909, and 910. In a case where the line contact occurs, it is possible to prevent a deficiency of a character caused by the line dividing.

As described above, in the case where the line contact occurs at the plurality of positions, and the pixels forming the characters of one of the upper and lower lines deeply get in the other line, the line dividing is performed in such a manner that a large line region is obtained, and the noise is removed from the divided line image. This makes it possible to restore the character rectangle without a deficiency of the character, and to improve the OCR accuracy.

Fourth Exemplary Embodiment

A fourth exemplary embodiment of the disclosure will be described below. In the present exemplary embodiment, only differences between the present exemplary embodiment and the first and second exemplary embodiments will be described, and configurations and procedures not particularly described are similar to the configurations and the procedures according to the first and second exemplary embodiments. In the above-described exemplary embodiments, the pixel block that contacts the line dividing position after the line dividing and satisfies the predetermined condition is removed and combined. In the present exemplary embodiment, before the line dividing, a pixel block contacting the line dividing position is classified as a pixel block to be included in an upper side of the line dividing position or a pixel block to be included in a lower side of the line dividing position.

Figure 10A:
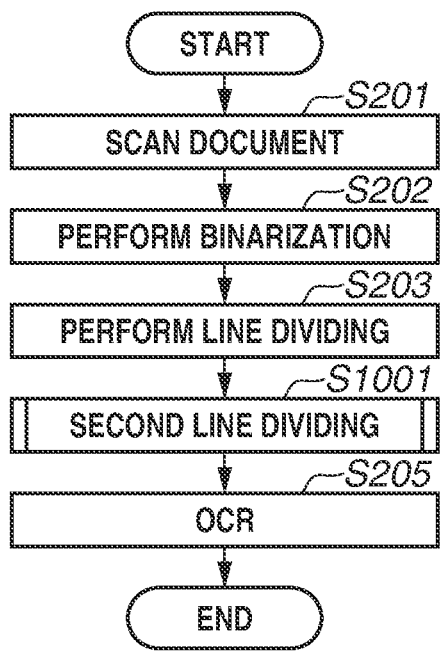
FIGS. 10A and 10B are flowcharts according to a fourth exemplary embodiment of the disclosure.
Figure 10B:
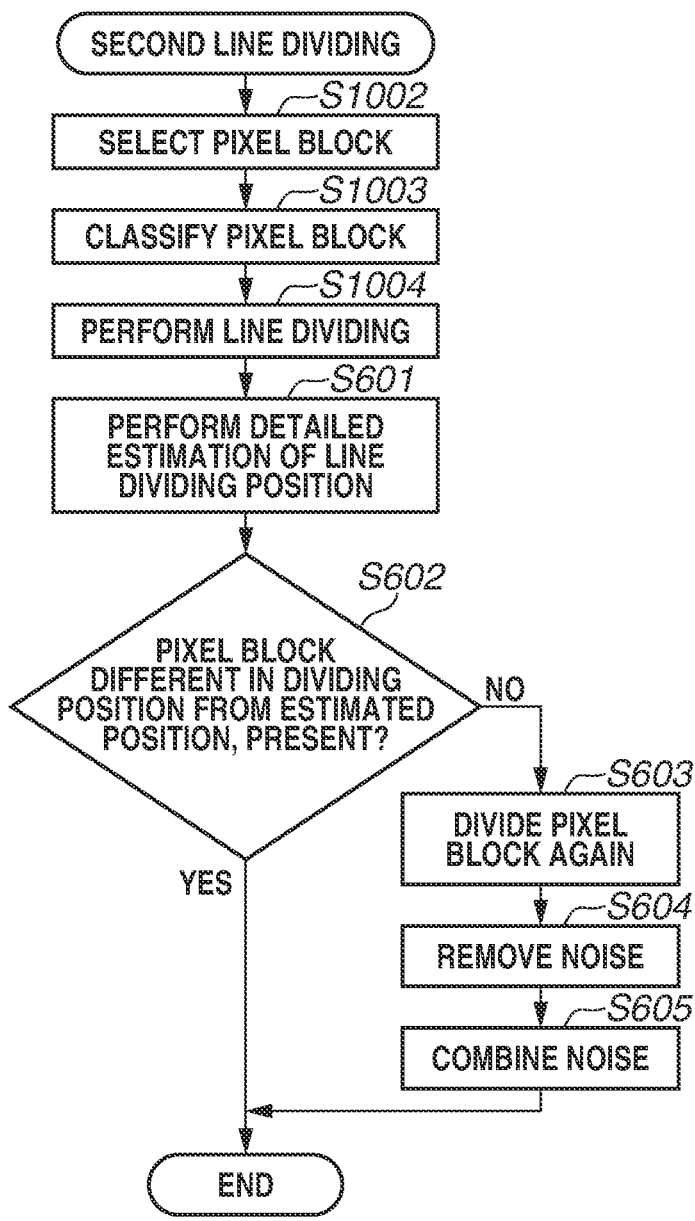

FIGS. 10A and 10B are flowcharts illustrating the line dividing processing according to the present exemplary embodiment. These flowcharts will be described with reference to FIGS. 11A, 11B, and 11C. In step S1001 of FIG. 10A, the CPU 111 performs second line dividing processing. The detail of the processing will be described below.

Next, the detail of the processing in step S1001 will be described with reference to FIG. 10B. In step S1002, the CPU 111 classifies pixel blocks contacting the line dividing position. FIG. 11A illustrates an example in which pixel blocks contacting the line dividing position 504 are classified.

Next, in step S1003, the CPU 111 classifies the selected pixel blocks into the following three categories. [1] A pixel block to be included in an upper line (ratio of pixels included in upper line is large). [2] A pixel block to be included in a lower line (ratio of pixels included in lower line is large). [3] Other pixel block (e.g., pixel block includes both pixels included in upper line and pixels included in lower line, and respective ratios of the pixels are similar).

In the present exemplary embodiment, while the classification is performed based on the ratio of the pixels included in each line, the classification may be performed based on a ratio of a height of the pixel block or a ratio of a circumscribed rectangle of the pixel block. FIG. 11B illustrates a classification example of the pixel block. Pixel blocks 1102 in the category [1] are pixel blocks to be included in the upper line. A pixel block 1104 in the category [2] is a pixel block to be included in the lower line. A pixel block 1103 in the category [3] is the other pixel block. In step S1004, the CPU 111 includes the pixel blocks of the category [1] in the upper line, includes the pixel blocks of the category [2] in the lower line, and forcibly divides each of pixel blocks of the category [3] at the line dividing position. FIG. 11C illustrates divided images. A divided line image 1105 illustrates the upper line obtained after the division at the position 504. A divided line image 1106 illustrates the lower line obtained after the division at the position 504.

As described above, pixel blocks contacting the line dividing position are classified into the categories, and dividing is performed based on the categories, which makes it possible to more accurately restore the character rectangle. Thus, it is possible to improve the OCR accuracy.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-120036, filed Jun. 27, 2019, which is hereby incorporated by reference herein in its entirety.

What is claimed is:

1. An apparatus comprising:
a memory; and
a processor in communication with the memory,
wherein the processor performs:
binarization processing to generate binary image by binarizing a scanned image;
first dividing to create a frequency distribution by counting black pixels that appear in each pixel line of the binary image, and to obtain text line regions by dividing the binary image at dividing positions which are determined based on the created frequency distribution, wherein the dividing positions are pixel lines each having a number of black pixels lower than a predetermined threshold in the created frequency distribution;
first detection to detect, from each of the text line region, a pixel block that includes consecutive black pixels, wherein the detected black pixel block contacts any of the dividing positions;
first determination to determine whether the pixel block detected in the first detection satisfies a first predetermined condition; and
first combination to combine the pixel block that is determined to satisfy the first predetermined condition in the first determination, with a text line region adjacent to the pixel block across a dividing position that the pixel block contacts.

2. The apparatus according to claim 1, wherein, in the first dividing, the obtained text line regions are regions where a number of black pixels is larger than or equal to the predetermined threshold in the created frequency distribution.

3. The apparatus according to claim 1, wherein the first predetermined condition is that a pixel block has an area smaller than or equal to a predetermined area.

4. The apparatus according to claim 1, wherein the first predetermined condition is that, when a pixel block is combined with a text line region adjacent to the pixel block across the dividing position that the pixel block contacts, black pixels included in the pixel block is combinable with consecutive black pixels included in the text line region adjacent to the pixel block across the dividing position.

5. The apparatus according to claim 1, wherein the processor further performs:
second dividing to divide image data, obtained by the combining in the first combination, again at a position that has a possibility of becoming a dividing position for a text line region;

second detection to detect a pixel block forming a character contacting the dividing position;
second determination to determine whether the pixel block detected in the second detection satisfies a second predetermined condition; and
second combination to combine the pixel block that is determined to satisfy the second predetermined condition in the second determination, with a text line region adjacent to the pixel block across the dividing position that the pixel block contacts.

6. The apparatus according to claim 5, wherein the position having the possibility is a position at which an upper end position or a lower end position of a pixel block forming a character is coincident with upper end positions or lower end positions of pixel blocks forming a plurality of characters included in a same line as a line including the pixel block.

7. The apparatus according to claim 5, wherein the possibility is determined to be high in a case where an upper end position or a lower end position of a pixel block including the pixel block combined in the first combination is coincident with upper end positions or lower end positions of pixel blocks forming a plurality of other characters included in a same line as the pixel block including the pixel block combined in the first combination, and is determined to be low in a case where the upper end position or the lower end position of the pixel block including the pixel block combined in the first combination is different from the upper end positions or the lower end positions of the pixel blocks forming the plurality of other characters included in the same line as the pixel block combined in the first combination.

8. The apparatus according to claim 5, wherein, in a case where a dividing position includes a predetermined number or more of pixel blocks forming a character, a position widened from a text line region is determined to be a dividing position in the first dividing, and the combination in the first combination is not performed.

9. The apparatus according to claim 8, wherein, in a case where the position widened from the text line region is determined to be the dividing position, the first predetermined condition in the first determination is determined based on a degree of widening.

10. The apparatus according to claim 1, wherein the processor further performs classification to classify a pixel block forming a character contacting a dividing position, as a pixel block to be included in a text line region above the dividing position or a pixel block to be included in a text line region below the dividing position based on a ratio between pixels of the pixel block included in the text line region above the dividing position and pixels of the pixel block included in the text line region below the dividing position.

11. The apparatus according to claim 1, wherein the apparatus performs character recognition on a character included in the image data obtained by the combining in the first combination.

12. A method for an apparatus that reads image data, the method comprising:
generating binary image by binarizing a scanned image;
creating a frequency distribution by counting black pixels that appear in each pixel line of the binary image, and obtaining text line regions by dividing the binary image at dividing positions which are determined based on the created frequency distribution, wherein the dividing positions are pixel lines each having a number of black pixels lower than a predetermined threshold in the created frequency distribution;
detecting, from each of the text line region, a pixel block that includes consecutive black pixels, wherein the detected black pixel block contacts any of the dividing positions;
determining whether the detected pixel block satisfies a predetermined condition; and
combining the pixel block that is determined to satisfy the predetermined condition, with a text line region adjacent to the pixel block across a dividing position that the pixel block contacts.

13. The method according to claim 12, wherein, in the determining dividing, the obtained text line regions are regions where a number of black pixels is larger than or equal to the predetermined threshold in the created frequency distribution.

14. The method according to claim 12, wherein the predetermined condition is that a pixel block has an area smaller than or equal to a predetermined area.

15. The method according to claim 12, wherein the predetermined condition is that, when a pixel block is combined with a text line region adjacent to the pixel block across the dividing position that the pixel block contacts, black pixels included in the pixel block is combinable with consecutive black pixels included in the text line region adjacent to the pixel block across the dividing position.

16. A non-transitory computer-readable storage medium storing a program to cause a computer to perform a method for an apparatus that reads image data, the method comprising:
generating binary image by binarizing a scanned image;
creating a frequency distribution by counting black pixels that appear in each pixel line of the binary image, and obtaining text line regions by dividing the binary image at dividing positions which are determined based on the created frequency distribution, wherein the dividing positions are pixel lines each having a number of black pixels lower than a predetermined threshold in the created frequency distribution;
detecting, from each of the text line region, a pixel block that includes consecutive black pixels, wherein the detected black pixel block contacts any of the dividing positions;
determining whether the detected pixel block satisfies a predetermined condition; and
combining the pixel block that is determined to satisfy the predetermined condition, with a text line region adjacent to the pixel block across a dividing position that the pixel block contacts.

17. The non-transitory computer-readable storage medium according to claim 16, wherein, in the determining dividing, the obtained text line regions are regions where a number of blacks pixels is larger than or equal to the predetermined threshold in the created frequency distribution.

18. The non-transitory computer-readable storage medium according to claim 16, wherein the predetermined condition is that a pixel block has an area smaller than or equal to a predetermined area.

19. The non-transitory computer-readable storage medium according to claim 16, wherein the predetermined condition is that, when a pixel block is combinable with a text line region adjacent to the pixel block across the dividing position that the pixel block contacts, black pixels included in the pixel block is combinable with consecutive black pixels included in the text line region adjacent to the pixel block across the dividing position.

* * * * *